United States Patent
Spesser

(10) Patent No.: US 10,604,018 B2
(45) Date of Patent: Mar. 31, 2020

(54) CHARGE CONTROLLER FOR A BATTERY IN A VEHICLE

(71) Applicant: Dr. Ing. h.c. F. Porsche Aktiengesellschaft, Stuttgart (DE)

(72) Inventor: Daniel Spesser, Illingen (DE)

(73) Assignee: Dr. Ing. h.c. F. Porsche Aktiengesellschaft (DE)

(*) Notice: Subject to any disclaimer, the term of this patent is extended or adjusted under 35 U.S.C. 154(b) by 24 days.

(21) Appl. No.: 15/006,161

(22) Filed: Jan. 26, 2016

(65) Prior Publication Data
US 2016/0214492 A1  Jul. 28, 2016

(30) Foreign Application Priority Data
Jan. 27, 2015 (DE) .................. 10 2015 101 094

(51) Int. Cl.
*B60L 11/18* (2006.01)
*H02J 7/00* (2006.01)
(Continued)

(52) U.S. Cl.
CPC .......... *B60L 11/1811* (2013.01); *B60L 53/20* (2019.02); *B60L 53/60* (2019.02); *B60L 58/12* (2019.02); *H02J 7/0052* (2013.01); *H02J 7/0055* (2013.01); *B60L 2240/662* (2013.01); *H02J 2007/0059* (2013.01); *H02M 1/4225* (2013.01); *H02M 3/3378* (2013.01); *H02M 2001/007* (2013.01); *Y02T 10/7005* (2013.01); *Y02T 10/705* (2013.01); *Y02T 10/7044* (2013.01); *Y02T 10/7072* (2013.01); *Y02T 10/7291* (2013.01); *Y02T 10/92* (2013.01);
(Continued)

(58) Field of Classification Search
CPC ...... B60L 11/1811; B60L 53/20; B60L 53/22; B60L 53/24; H02M 3/00; H02M 3/22
USPC ........................................................ 320/109
See application file for complete search history.

(56) References Cited

U.S. PATENT DOCUMENTS 6,225,708 B1 * 5/2001 Furukawa ................. G06F 1/30
307/23
6,281,660 B1 * 8/2001 Abe ....................... B60K 6/543
320/103
(Continued)

FOREIGN PATENT DOCUMENTS

DE   10 2010 006 125    8/2011
DE   10 2010 014 104    10/2011
(Continued)

OTHER PUBLICATIONS

German Search Report dated Oct. 13, 2015.
Korean Examination Report dated Mar. 27, 2019.

*Primary Examiner* — Drew A Dunn
*Assistant Examiner* — Tessema Kebede
(74) *Attorney, Agent, or Firm* — Gerald E. Hespos; Michael J. Porco; Matthew T. Hespos

(57) ABSTRACT

A method for charging a battery of a vehicle uses a battery charging station that provides an electric current at a first DC voltage. The electric current that is output by the battery charging station at the first DC voltage is supplied to a charger of the vehicle, The electric current at the first DC voltage is converted within the charger into a second electric current at a second DC voltage that is required for charging the battery of the vehicle, and then is supplied to the battery.

2 Claims, 3 Drawing Sheets

(51) Int. Cl.
    *B60L 53/20* (2019.01)
    *B60L 58/12* (2019.01)
    *B60L 53/60* (2019.01)
    *H02M 1/42* (2007.01)
    *H02M 1/00* (2006.01)
    *H02M 3/337* (2006.01)

(52) U.S. Cl.
    CPC ............ *Y02T 90/121* (2013.01); *Y02T 90/127* (2013.01); *Y02T 90/128* (2013.01); *Y02T 90/14* (2013.01); *Y02T 90/16* (2013.01); *Y02T 90/163* (2013.01)

(56) References Cited

U.S. PATENT DOCUMENTS

| | | | | |
|---|---|---|---|---|
| 8,148,949 | B2* | 4/2012 | Oliveira | B60L 11/1811 320/104 |
| 8,307,930 | B2* | 11/2012 | Sailor | B60K 1/04 180/65.275 |
| 8,618,771 | B2* | 12/2013 | Ichikawa | B60L 11/123 320/109 |
| 9,373,971 | B2 | 6/2016 | Ichikawa et al. | |
| 2001/0054881 | A1* | 12/2001 | Watanabe | H02J 7/0065 320/166 |
| 2010/0213902 | A1 | 8/2010 | Oliveira et al. | |
| 2012/0038324 | A1 | 2/2012 | Humphrey et al. | |
| 2012/0091972 | A1* | 4/2012 | Narel | B60L 11/1838 320/162 |
| 2012/0249065 | A1* | 10/2012 | Bissonette | B60L 11/184 320/109 |
| 2013/0049677 | A1* | 2/2013 | Bouman | B60L 1/003 320/106 |
| 2013/0106365 | A1* | 5/2013 | Ang | B60L 3/0069 320/138 |
| 2013/0221921 | A1* | 8/2013 | Ang | B60L 11/1811 320/109 |
| 2013/0307471 | A1 | 11/2013 | Ichikawa et al. | |
| 2013/0311017 | A1* | 11/2013 | Matsunaga | B60L 3/00 701/22 |
| 2013/0314039 | A1 | 11/2013 | Weber et al. | |
| 2013/0314093 | A1 | 11/2013 | Cheng et al. | |
| 2014/0091764 | A1* | 4/2014 | Kinomura | B60L 11/1818 320/109 |
| 2014/0132203 | A1* | 5/2014 | Schillinger | H02J 7/04 320/107 |
| 2015/0372499 | A1* | 12/2015 | Purcarea | H02M 7/217 307/104 |

FOREIGN PATENT DOCUMENTS

| | | |
|---|---|---|
| DE | 10 2011 017 567 | 2/2012 |
| DE | 10 2011 079 242 | 1/2013 |
| DE | 10 2011 118 957 | 5/2013 |
| DE | 10 2013 011 104 | 1/2015 |
| EP | 2 581 257 | 4/2013 |
| JP | 2009-142135 | 6/2009 |
| JP | 2013-243844 | 12/2013 |
| KR | 10-2011-0121618 | 11/2011 |

* cited by examiner

CHARGE CONTROLLER FOR A BATTERY IN A VEHICLE

CROSS REFERENCE TO RELATED APPLICATION

This application claims priority under 35 USC 119 to German Patent Appl. No. 10 2015 101 094.1 filed on Jan. 27, 2015, the entire disclosure of which is incorporated herein by reference.

BACKGROUND

1. Field of the Inventoin

The invention relates to a method for charging a battery that a vehicle comprises using a battery charging station. The invention also relates, to a vehicle having an electric battery, a charge controller and at least one charger. The invention further relates to a charger and a charge controller.

2. Description of the Related Art

Electrically driven vehicles are supplied with electricity by batteries. Vehicles increasingly are operated with electric currents of a DC voltage of 800 volts to achieve low weight by virtue of small cable cross sections and hence to achieve long ranges for the vehicles. Traditional battery charging stations provide electric currents at a DC voltage of 400 volts, and it has not been possible to charge batteries with a voltage requirement of 800 volts using traditional battery charging stations.

DE 10 2010 006 125 A1 discloses a charger having an inverter on the grid side that converts a DC voltage provided by a battery charging station into an AC voltage.

EP 2 581 257 A2 discloses a battery charging station that matches a voltage for a charging current provided for charging a vehicle to requirements of the vehicle.

U.S. Pat. No. 6,281,660 B1 discloses a charger having an inverter. The charger comprises an intermediate circuit having capacitors for converting an electric current at a DC voltage into an electric current at a higher AC voltage.

US 2013/0049677 discloses a battery charging station having a number of charging interfaces. The battery charging station is configured to supply a respective charging interface with an electric current at DC voltage or an electric current at AC voltage on the basis of requirements of a respective vehicle that needs to be charged.

US 2013/0311017 discloses an electric vehicle and an external appliance arranged on a battery charging station that is electrically connected to the vehicle. The external appliance is configured to exchange electric current with the vehicle if anomalies occur during a charging process by the battery charging station.

US 2013/0314093 discloses a charging system for supplying an electric vehicle with electric current at AC voltage.

US 2014/0091764 discloses an electrically driven vehicle that can be charged both by electric current at AC voltage and by electric current at DC voltage.

Against this background, it is an object of the invention to provide a way of charging a vehicle that requires an electric current at a first voltage using a battery charging station, wherein the battery charging station delivers an electric current at a second voltage lower than the required voltage of the vehicle.

SUMMARY

The invention relates to a method for charging a battery by using a battery charging station that provides an electric current at a first DC voltage. The method then supplies the electric current that is output by the battery charging station at the first DC voltage to a charger of the vehicle. The electric current at the first DC voltage is converted within the charger into a second electric current at a second DC voltage that is required for charging the battery of the vehicle, and then is supplied to the battery.

The method is used particularly for charging a battery of a vehicle having an onboard power supply system at a voltage of 800 volts, i.e. between 750 volts and 850 volts, for example, depending on the state of charge of the battery, using a battery charging station at a different, lower voltage, for example 400 volts.

The method includes converting the electric current provided by the battery charging station into an electric current at a second voltage that is suitable for charging the battery, thereby still using an electric current provided by an infrastructure or a battery charging station at a first voltage that is too low for charging a respective battery.

The method converts the first voltage into the second voltage by routing the electric current provided by the battery charging station via a path to the charger of the vehicle and supplying the current to an intermediate circuit therein in parallel. The intermediate circuit may comprise a DC-DC voltage converter or a step-up converter to convert the electric current at the first voltage into the electric current at the second voltage. This means that transformation of the electric current provided by the battery charging station into an electric current that is suitable for charging a battery of the vehicle is achieved by the supply of the electric current provided by the battery charging station and by virtue of connection of a power path within the vehicle between the battery charging station and a power converter.

The vehicle may comprise a charge controller that changes over between different charging paths of the vehicle on the basis of electrical properties, such as a respective voltage of a respective electric current provided by the battery charging station. At least one charging path is routed via the charger and at least one further path can be used for directly charging the battery.

The invention enables a vehicle to be charged at a multiplicity of battery charging stations, each of which provides electric currents having respective electrical properties. More particularly, an intelligent charge controller is provided and senses the electrical properties, i.e. a voltage and/or a current intensity, for example, of an electric current provided by a respective battery charging station and routes the electric current on a respective path through the vehicle to the battery, the charger or the intermediate circuit of the charger comprises, for example, on the basis of its electrical properties. Accordingly, when alternating current is provided by a battery charging station, for example, provision may be made for the charge controller to transmit the alternating current to the charger, for the charger to transform the alternating current into a desired voltage, rectify it and to transmit it to the battery of the respective vehicle.

Alternatively, when a direct current is provided by a further battery charging station and corresponds to a voltage of an onboard power supply system of the vehicle, the direct current may be routed directly to the battery to charge the battery.

The charge controller of a vehicle can use a communication link to communicate with the battery charging station to sense the electrical properties of an electric current provided by a battery charging station, and/or can use measuring instruments that measure the electrical properties of the electric current.

The charger may comprise an electrical link for isolating a circuit at the first DC voltage from a circuit at the second DC voltage. An electric current at the first DC voltage is converted, following the conversion into an electric current at the second DC voltage, into an alternating current and routed via the electrical link and, after the electrical link, is converted back into a direct electric current at the second voltage.

The charger of the vehicle may comprise an electrical link for isolating an onboard power supply system of the vehicle from a charging circuit that is supplied with electric current by a respective battery charging station and to prevent discharge of the battery of the respective vehicle. The electrical link can be overcome by an alternating current, for example. This means that a direct current needs to be converted into a corresponding alternating current to overcome the electrical link and, after the link, may need to be converted back into the direct current again to charge the battery of the vehicle. For the purpose of converting a direct current into an alternating current and back into a direct current again, the charger comprises appropriate intermediate circuits having rectifiers and inverters and also possibly transformers.

The invention also comprises a vehicle having an electric battery, a charge controller and at least one charger. The vehicle can be connected to a battery charging station that can supply the vehicle or the battery with an electric current at a first DC voltage. The charge controller is configured so that, if the first DC voltage is lower than a voltage that is required for charging the battery, the charge controller transmits an electric current that can be transmitted from the battery charging station to the vehicle, to the charger via a power path. The charger is configured to convert the electric current at the first DC voltage into a second electric current at a second DC voltage, with the second DC voltage being suitable for charging the battery. The vehicle may be used for carrying out the above-described method.

The invention also relates to a charger for a vehicle that is configured to convert an electric current that can be provided by a battery charging station at a first DC voltage into an electric current at a second DC voltage and to charge a battery of the vehicle by supplying the electric current to the battery or the vehicle as appropriate. The charger may be used for carrying out the above-described method.

The invention further relates to a charge controller for controlling a charging process for charging a battery of a vehicle at a battery charging station. The charge controller comprises a module for measuring a voltage for an electric current that can be provided by the battery charging station and a module for changing over to different charging paths within the vehicle on the basis of electrical properties of the electric current that can be provided by the battery charging station.

The charge controller may be used for carrying out the above-described method. The charge controller is in contact both with a battery and with a charger of a vehicle via communication links to initialize different charging conditions depending on electrical properties of an electric current provided by a respective battery charging station and, by way of example, to configure the charger as appropriate. Thus, the charge controller can, for example in the case of an electric current at a voltage that is reduced in comparison with an onboard power supply system, activate the charger using an intermediate circuit that is suitable for converting the electric current and can transmit the electric current to the intermediate circuit of the charger.

If an electrical voltage that is required by the battery of the vehicle is available directly, the charge controller can transmit the corresponding electric current to the battery directly without the need for the electric current to be routed via the charger.

The charge controller may comprise a protection module for decoupling the battery charging station from the vehicle if an intermediate circuit of a charger of the vehicle is overloaded.

The charge controller can isolate the intermediate circuit from the battery charging station to prevent overload of the intermediate circuit and the charger. The charge controller may access a sensor system for sensing a state of the intermediate circuit or of the charger, such as a temperature sensor, to identify an overload.

The charge controller may comprise a module for adapting an efficiency of conversion of an electric current at the first DC voltage into an electric current at the second DC voltage by a charger.

The charge controller may be embodied as a program in a controller that a respective vehicle already comprises.

To react to temperature fluctuations in the charger, for example as a result of high conversion rates, or intense transformation processes, without a respective charging process being interrupted, it is conceivable for the efficiency of the conversion or of the transformation process for the electric current at the first voltage into the electric current at the second voltage to be reduced. This means that the second voltage is reduced by 5% or 10%, for example, so that the battery of a respective vehicle can still be charged, but correspondingly less transformation power can be provided and correspondingly less waste heat is generated.

In a further embodiment, the charge controller is configured to regulate the adaptation of the efficiency on the basis of environmental data sensed by at least one sensor for surroundings and/or the charger.

Environmental influences, such as outside temperature or air humidity, have a significant influence on stress, particularly thermal stress for a respective charger. Thus, the efficiency or the required second voltage is adapted on the basis of environmental influences outside a respective vehicle and/or inside the charger to prevent overload, for example as a result of the charger overheating.

Further advantages and embodiments of the invention will emerge from the description and the accompanying drawing.

It goes without saying that the features cited above and those explained below can be used in the respectively indicated combination but also in other combinations or on their own without departing from the scope of the present invention.

The invention is shown schematically on the basis of embodiments in the drawings and is described schematically and in detail with reference to the drawings.

DETAILED DESCRIPTION

Figure 1:
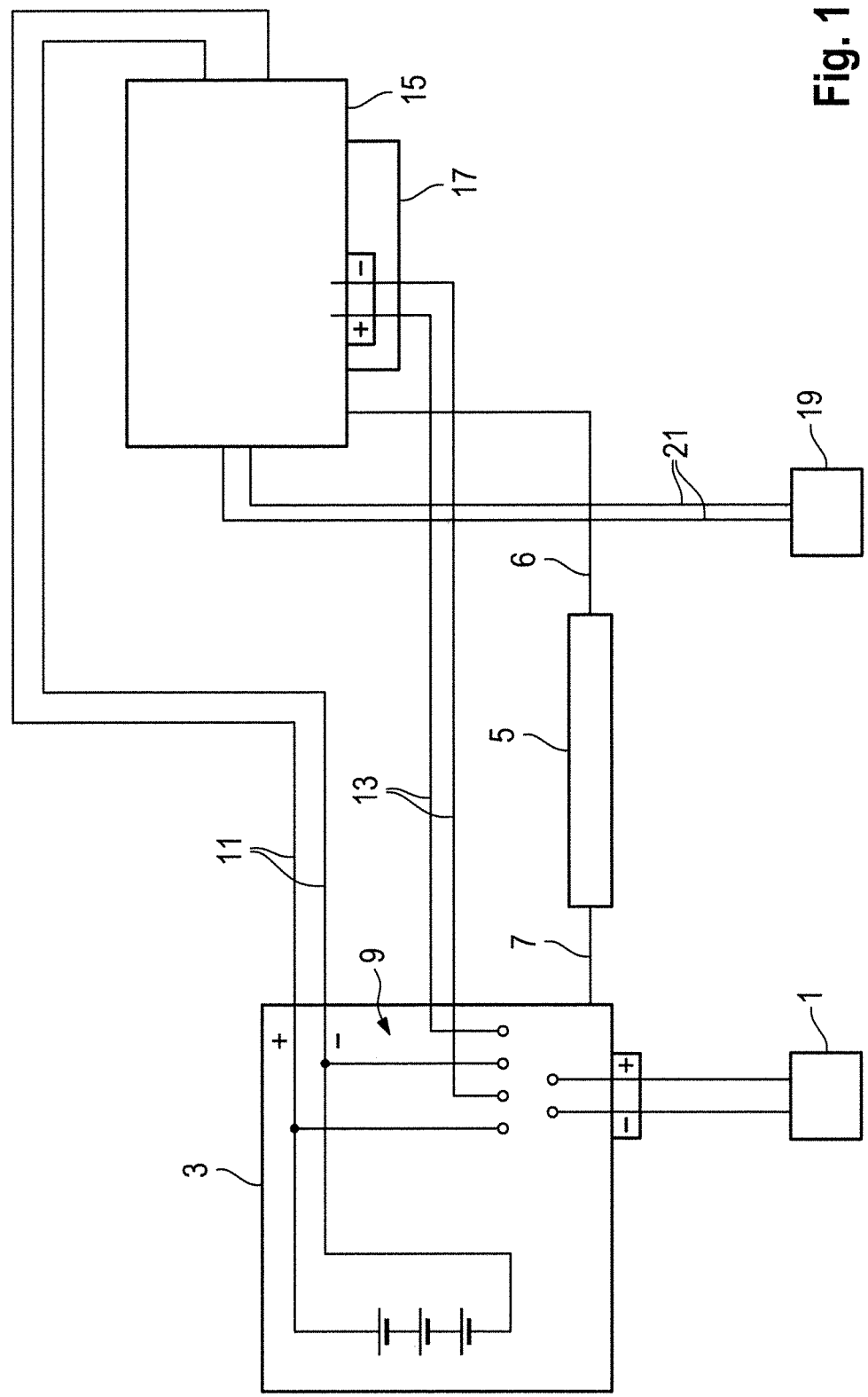
FIG. 1 is a schematic view of a charging system for a battery of a vehicle with an embodiment of the charger and an embodiment of the charge controller.

FIG. 1 shows a battery charging station 1 that can supply a battery 3 with electric current at a first voltage, i.e. can charge said battery. A charge controller 5 is in contact with the battery 3 via a communication link 7 and, by a communication link 6, in contact with a charger 15 that is permanently to a respective vehicle. On the basis of electrical properties of the electric current provided by the battery charging station 1 or a further battery charging station 19, the charge controller 5 transmits or switches the corresponding electric current to a charging path 9, 13, or 21, with the charging path 21, which is routed via the charger 15, always being chosen when an electric current at AC voltage is provided (step 102).

When the battery charging station 1 provides an electric current that corresponds to a voltage for the battery 3, i.e. the voltage of the electric current from the battery charging station 1 and a voltage that is required for charging the battery 3 are identical (step 112), the charge controller 5 transmits the electric current from the battery charging station 1 via the charging path 9 directly to the battery 3 to charge the battery 3 (step 114).

If the battery charging station 19 provides an electric current at an AC voltage (step 116), the charge controller 5 transmits (step 118) the electric current provided by the battery charging station 19 via charging path 21 to the charger 15, for example, where the electric current is (step 120) transformed, rectified and forwarded (step 122)to the battery 3 via a path 11.

If only a direct current at a voltage that is lower in comparison with a voltage that is required by the battery 3 is available via the battery charging station 1 (step 104), the charge controller 5 transmits (step 106) a corresponding electric current to the charger 15 via charging path 13 and a high-voltage interface 17. The charger 15 converts (step 108) the electric current at the voltage that is too low in comparison with the voltage required by the battery 3 into an electric current at a voltage that is suitable for charging the battery and transmits (step 110) the converted electric current to the battery 3 via the path 11.

Figure 2:
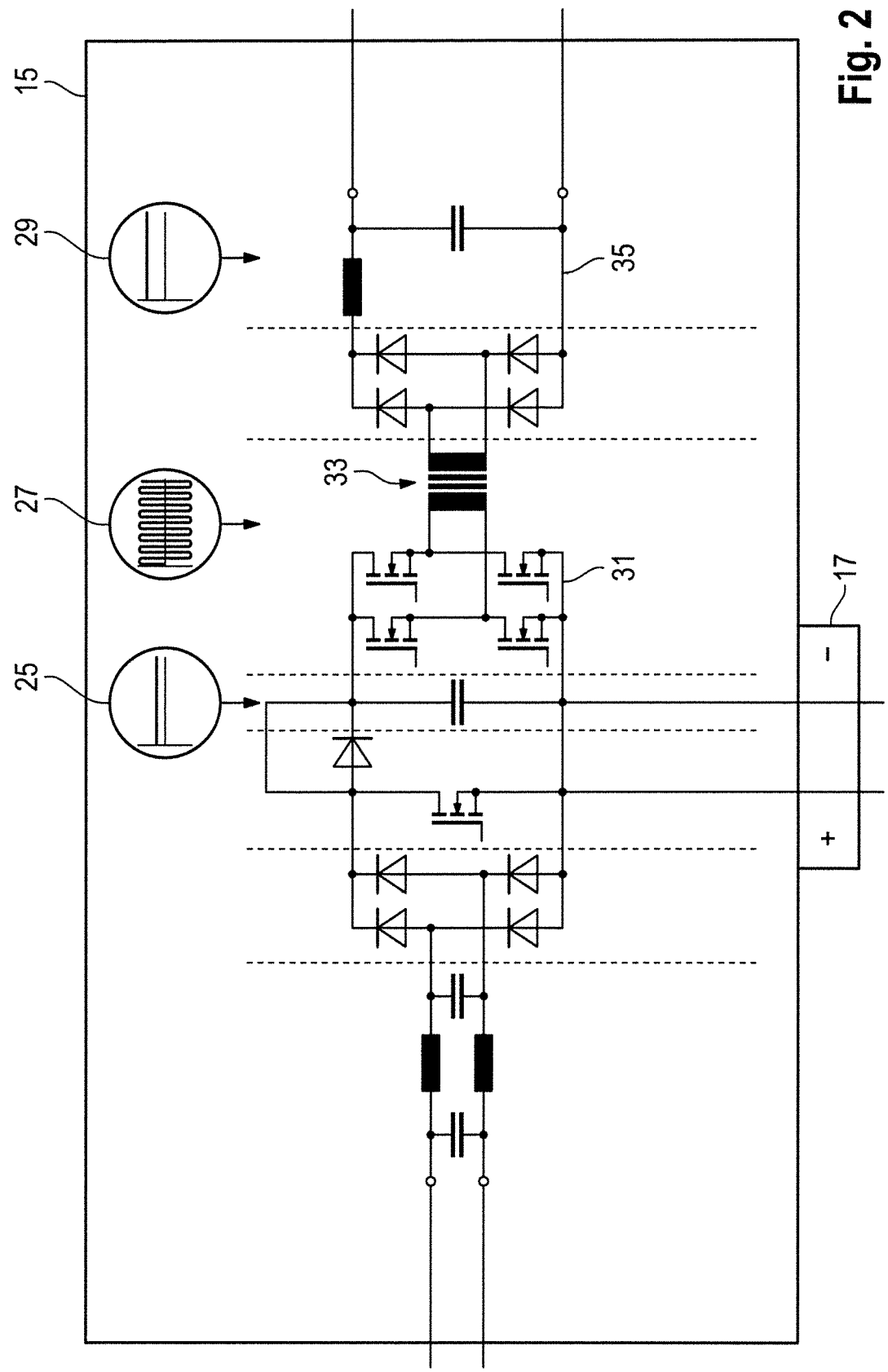
FIG. 2 is a detail view of the charger from FIG. 1.
Figure 3:
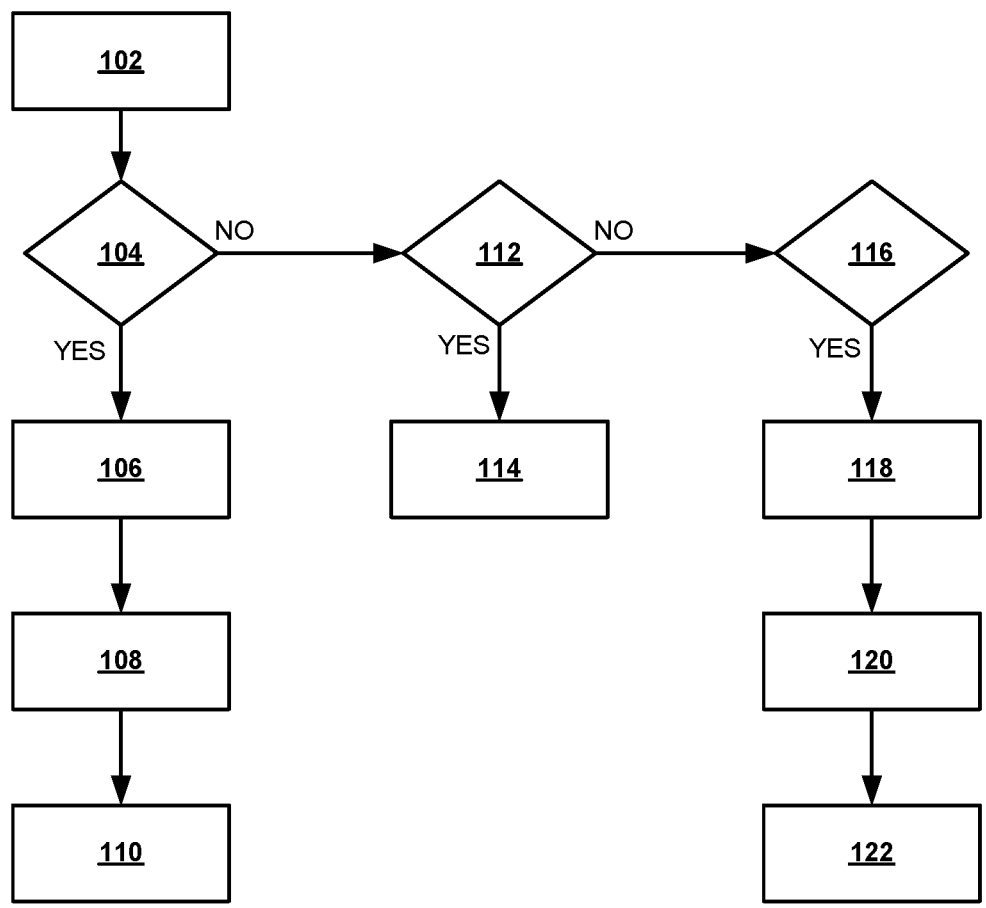
FIG. 3 is a flow diagram of a method for use with the charger of FIG. 1.

FIG. 2 shows a detail view of the charger 15 that is supplied with an electric current by the battery charging station 1 via the high-voltage interface 17. However, the current has a voltage that is too low in comparison with a voltage that is required by the battery 3. The electric current provided via the battery charging station 1, as illustrated in a graph 25, is supplied to an intermediate circuit 31 of the charger 15 and transformed by a DC-DC converter to convert the electric current provided via the battery charging station 1 into an electric current at a voltage that is suitable for charging the battery 3.

The electric current must move through an electrical link 33 to supply the transformed electric current to an onboard power supply system for supplying power to the battery 3. To this end, the electric current that has been converted into an electric current at a higher voltage by the DC-DC converter, is chopped into an electric current at AC voltage 27 and routed via the electrical link 33. On a side opposite the intermediate circuit 31, the electric current is supplied to a further intermediate circuit 35, where it is rectified, as illustrated by graph 29.

In the intermediate circuit 35, the voltage provided by the intermediate circuit 31 is applied together with a peak voltage that may appear. Specifically, this can mean, by way of example, that an electric current provided by the battery charging station 1 at a voltage of 400 volts is stepped up to a voltage of 800 volts in the intermediate circuit 31, chopped, routed via the electrical link 33 and rectified in the intermediate circuit 35, the voltage of the electric current in the intermediate circuit 35 possibly being between 700 volts and 1200 volts or higher on the basis of the peak voltage.

Next, the rectified electric current transformed into the higher voltage is transmitted to the battery 3.

What is claimed is:

1. A method for charging a battery of a vehicle, the method comprising:
   using a battery charging station that provides an electric current to the vehicle;
   using a charge controller to change between different charging paths of the vehicle based on electrical properties of the electric current provided by the battery charging station,
   if the electric current provided by the battery charging station is at a first DC voltage, the first DC voltage being lower than a second DC voltage that is required for charging the battery, transmitting, by the charge controller, the electric current at the first DC voltage from the battery charging station to a charger of the vehicle via a first charging path;
   converting the electric current at the first DC voltage within the charger into a second electric current at the second DC voltage;
   transmitting the second electric current at the second DC voltage to the battery via a second charging path;
   if the electric current provided by the battery charging station is at the second DC voltage, bypassing the charger and transmitting, by the charge controller, the electric current at the second DC voltage from the battery charging station directly to the battery via a third charging path;
   if the electric current provided by the battery charging station is an AC voltage, transmitting, by the charge controller, the electric current at the AC voltage to the charger via a fourth charging path;
   transforming the electric current at the AC voltage into an electric current at the second DC voltage; and
   supplying the electric current at the second DC voltage to the battery via the second charging path wherein:
   the charger comprises an electrical link for isolating a circuit at the first DC voltage from a circuit at the second DC voltage; and, after converting the electric current at the first DC voltage into the second electric current at the second DC voltage and before the transmitting of the second electric current at the second DC voltage to the battery via a second charging path, the method further comprises: converting the second electric current into an alternating current routed via the electrical link and, after the electrical link, converting the alternating current back into a direct electric current at the second voltage.

2. The method of claim 1, in which the first DC voltage is supplied to an intermediate circuit of the charger.

* * * * *